United States Patent
Ophoven et al.

(10) Patent No.: US 8,077,480 B2
(45) Date of Patent: Dec. 13, 2011

(54) FARADAY CAGE FOR CAMERA

(75) Inventors: Timothy M. Ophoven, Eagan, MN (US); Charles G. Huss, Shakopee, MN (US); Kevin J. Benning, Lakeville, MN (US); Nathan D. Evans, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 474 days.

(21) Appl. No.: 12/323,741

(22) Filed: Nov. 26, 2008

(65) Prior Publication Data
US 2010/0128455 A1 May 27, 2010

(51) Int. Cl.
H05K 9/00 (2006.01)
(52) U.S. Cl. ......... 361/818; 396/543; 348/262; 439/330
(58) Field of Classification Search .......... 396/543, 396/348, 160, 4; 359/507, 508, 823, 511; 359/819; 348/262, 148; 235/462.43, 472.02; 439/188, 330, 71; 361/818, 748, 760, 679.56; 174/260, 255
See application file for complete search history.

(56) References Cited

U.S. PATENT DOCUMENTS

| | | | |
|---|---|---|---|
| 4,359,277 A | 11/1982 | Shimizu et al. | |
| 5,268,810 A | 12/1993 | DiMarco et al. | |
| 5,362,243 A | 11/1994 | Huss et al. | |
| 5,488,540 A | 1/1996 | Hatta et al. | |
| 5,914,644 A | 6/1999 | Carter et al. | |
| 6,002,437 A | 12/1999 | Morioka et al. | |
| 6,029,013 A * | 2/2000 | Larkin et al. | 396/160 |
| 6,211,457 B1 | 4/2001 | Cama et al. | |
| 6,809,255 B1 | 10/2004 | Chun | |
| 6,818,837 B2 | 11/2004 | Okami | |
| 6,900,843 B1 | 5/2005 | Uchiyama | |
| 6,965,072 B2 | 11/2005 | Gustafsson et al. | |
| 7,042,737 B1 | 5/2006 | Woolsey et al. | |
| 7,280,368 B2 | 10/2007 | Iwamiya et al. | |
| 7,366,409 B2 * | 4/2008 | Kurosawa | 396/543 |
| 7,435,016 B2 * | 10/2008 | Nomura | 396/348 |
| 2006/0189183 A1 | 8/2006 | Yang | |
| 2009/0294629 A1 | 12/2009 | Drotleff et al. | |

FOREIGN PATENT DOCUMENTS

| | | |
|---|---|---|
| EP | 0656171 A1 | 6/1995 |
| EP | 0888040 A2 | 12/1998 |
| EP | 1836841 A1 | 9/2007 |

(Continued)

OTHER PUBLICATIONS

Great Britian Search Report for GB0920418.8, dated Jan. 28, 2010.

(Continued)

*Primary Examiner* — Hung Duong
(74) *Attorney, Agent, or Firm* — Scott D. Wofsy; Edwards Wildman Palmer LLP

(57) ABSTRACT

A camera includes an electrically conductive housing defined by exterior walls and an interior cavity. The exterior walls of the housing have a lens opening and a connector opening formed therein. An imaging device is disposed within the interior cavity of the housing and communicates with the lens opening. A printed wiring board (PWB) is disposed within the interior cavity of the housing separating the imaging device from the connector opening. The PWB has an electrically conductive chassis plane operatively connected to the exterior walls of the housing so that the chassis plane and the housing form at least a partial Faraday cage around the imaging device.

19 Claims, 4 Drawing Sheets

FOREIGN PATENT DOCUMENTS

| | | |
|---|---|---|
| EP | 1944807 | 7/2008 |
| JP | 11239288 A | 8/1999 |
| JP | 2007022364 A | 2/2007 |
| WO | WO-2006072518 A1 | 7/2006 |
| WO | WO-2008061025 | 5/2008 |

OTHER PUBLICATIONS

Great Britian Search Report for GB0920418.8, dated Apr. 8, 2010.

* cited by examiner

FARADAY CAGE FOR CAMERA

BACKGROUND OF THE INVENTION

1. Field of the Invention

The present invention relates to cameras and imaging devices, and more particularly to cameras for use in EMI sensitive environments.

2. Description of Related Art

During operation, all electronic devices radiate unwanted electrical signals known as electromagnetic interference (EMI). In general, unwanted EMI can be dealt with in two ways: either by electrical or circuit level modifications, or by physical shielding. Of course, a combination of both types can be used for a particular device as appropriate.

Electrical techniques include modifying the timing of clock signals by frequency modulation so that the spectral density is reduced. This technique is also called clock skewing. This does not lessen the overall energy of the emitted EMI, but it does reduce unwanted peaks that would block frequency channels needed for data communication, e.g., by radio transmitters used in a mobile telephone. At the circuit level, the length of a path that could act as an aerial to transmit or receive EMI can be minimized. The effectiveness of this technique is necessarily limited by the need to use high frequency clocks and signaling. Other circuit techniques exist such as the introduction of lossy components and low impendence paths to ground to suppress noise.

Physical techniques for suppressing EMI predominately involve encasing electronic components within shielding in the form of electrically conductive walls or ground planes. The shields can act to absorb EMI, or simply to reflect it back into the body of the device, depending on the type and quantity of material that is used.

A physical structure completely surrounding a cavity with electrically conductive walls is known as a Faraday cage. A Faraday cage shields its interior cavity from EMI by canceling EMI transmissions across the cage through electrical conduction. In practical application, most electrical devices need a way to send signals in and out, such as by means of a cable, so a complete Faraday cage cannot be used. Rather, a partial Faraday cage is typically used in which apertures through the electrically conductive walls allow for desirable signals to pass into and/or out of the electrical device inside.

In the case of shielded cameras, signals typically pass into and out of the housing by way of a cable connector. A partial Faraday Cage surrounding the electronic components of such a camera has a relatively large opening where the cable connector passes through the walls of the Faraday cage. The connector opening in a typical camera is large enough to provide a path for unwanted Radio Frequency (RF) emissions to radiate in and out of the camera housing. This can be problematic for cameras used in EMI sensitive applications, such as onboard aircraft, for example. Existing cameras have had difficulty passing the emissions and susceptibility requirements which are required for certification by the FAA or other governing authority.

Such conventional methods and systems generally have been considered satisfactory for their intended purpose. However, there still remains a continued need in the art for camera components that have improved performance in EMI sensitive environments. There also remains a need for such camera components that are easy to make and use. The present invention provides a solution for these problems.

SUMMARY OF THE INVENTION

The subject invention is directed to a camera having an electrically conductive housing defined by exterior walls and an interior cavity. The exterior walls of the housing have a lens opening and a connector opening formed therein. An imaging device is disposed within the interior cavity of the housing and optically communicates with the lens opening. A printed wiring board (PWB) disposed within the interior cavity of the housing separates the imaging device from the connector opening. The PWB has an electrically conductive chassis plane operatively connected to the exterior walls of the housing such that the chassis plane and the housing form at least a partial Faraday cage around the imaging device.

In certain embodiments, the camera further includes a camera connector operatively associated with the connector opening of the housing. The connector is electrically coupled to the imaging device to convey signals between the imaging device and an area remote from the housing. The PWB is located between the imaging device and the connector to reduce unwanted radio frequency emissions between the imaging device and the connector opening of the housing.

It is also contemplated that the Faraday cage can include a passage accommodating a transmission line passing therethrough. The transmission line is electrically connected to the imaging device to conduct a signal between the imaging device and an area external to the housing. The transmission line can include a first EMI filter between the imaging device and the PWB to filter unwanted radio frequency emissions from the imaging device to the connector opening along the transmission line. In addition to, or in lieu of the first EMI filter, the transmission line can include a second EMI filter between the PWB and the connector opening of the housing to filter unwanted radio frequency emissions from the connector opening to the imaging device along the transmission line. The passage accommodating the transmission line therethrough can be defined through the chassis plane of the PWB, between the chassis plane and the exterior walls of the housing, or through any other suitable portion of the Faraday cage.

The passage through the Faraday cage can be dimensioned to reduce transmission of unwanted radio frequency emissions therethrough above a predetermined wavelength. The Faraday cage can be configured to attenuate emissions below 1 GHz by limiting gaps or openings within the Faraday cage to 1.5 cm or less.

In certain embodiments, a gap is defined between the external walls of the housing and a periphery of the PWB, and wherein the gap is dimensioned and configured to reduce transmission of unwanted radio frequency emissions therethrough below a predetermined frequency. The PWB can be fastened to the housing by electrically conductive standoffs, operatively connecting the chassis plane to the housing. It is also possible for the PWB to be fastened, electrically sealed, or otherwise operatively connected to an inwardly extending mounting ledge defined in the interior cavity of the housing, or to any other suitable portion of the housing, to operatively connect the chassis plane to the housing.

The invention also provides a Faraday cage for shielding an electronic device. The Faraday cage includes an electrically conductive housing defined by exterior walls and an interior cavity. A PWB is electrically connected to the exterior walls of the housing. The PWB includes a layer stackup having a plurality of layers including a first signal layer on an imaging device side of the layer stackup, and a second signal layer on a side of the layer stackup opposite from the first signal layer. A substantially solid, electrically conductive chassis plane is included in the layer stackup between the first and second signal layers. The chassis plane includes at least one mounting surface electrically coupling the chassis plane to the exterior walls of the housing.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
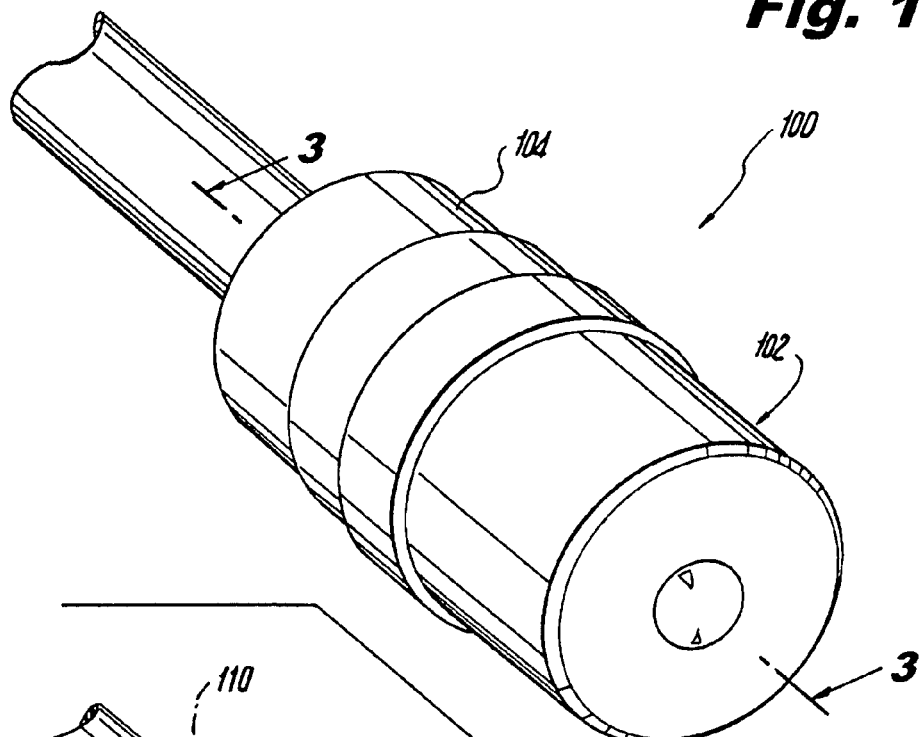
FIG. 1 is a perspective view of an exemplary embodiment of a camera constructed in accordance with the present invention, showing the camera housing.

Reference will now be made to the drawings wherein like reference numerals identify similar structural features or aspects of the subject invention. For purposes of explanation and illustration, and not limitation, a partial view of an exemplary embodiment of a camera in accordance with the invention is shown in FIG. 1 and is designated generally by reference character 100. Other embodiments of cameras in accordance with the invention, or aspects thereof, are provided in FIGS. 2-10, as will be described. The devices and methods of the invention can be used to improve the EMI performance of cameras in EMI sensitive environments such as onboard aircraft, or in any other suitable application.

Figure 2:
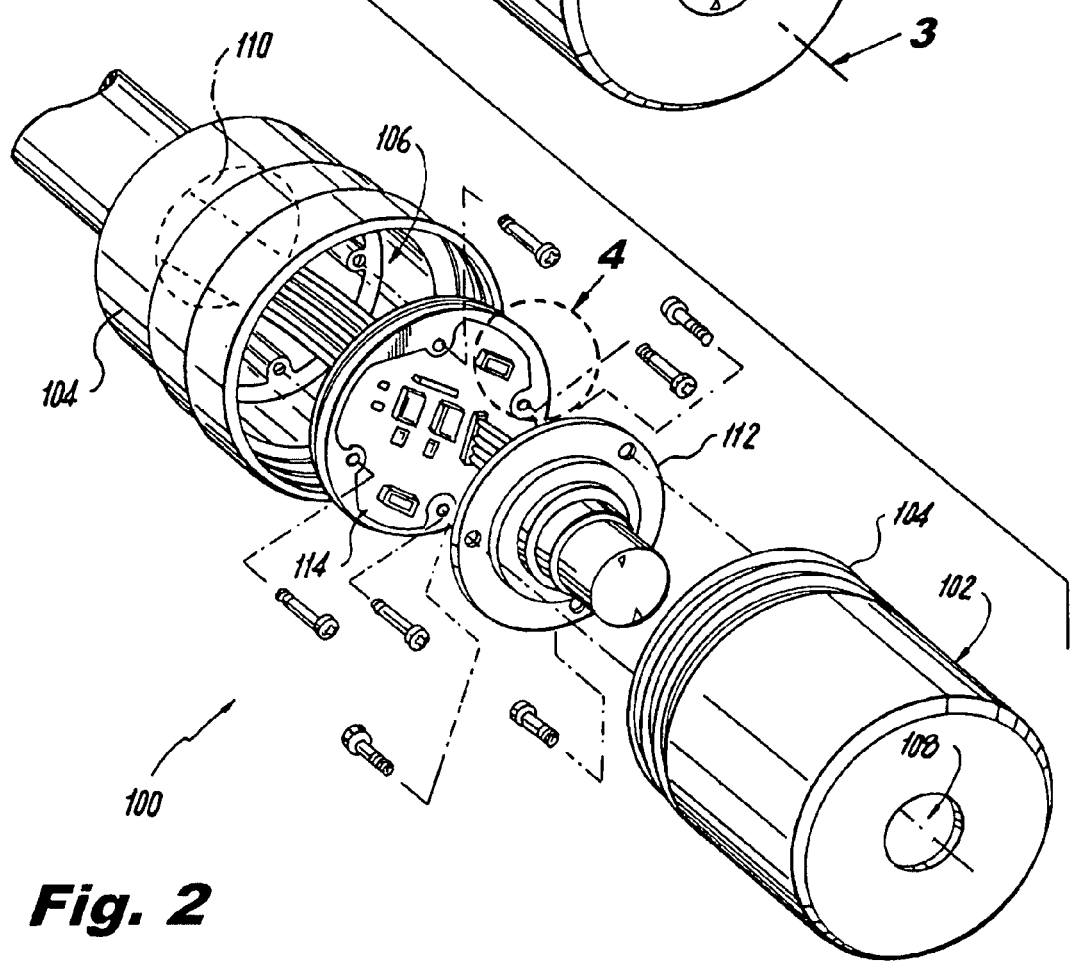
FIG. 2 is an exploded perspective view of the camera of FIG. 1, showing the imaging components and printed wiring board (PWB)
Figure 3:
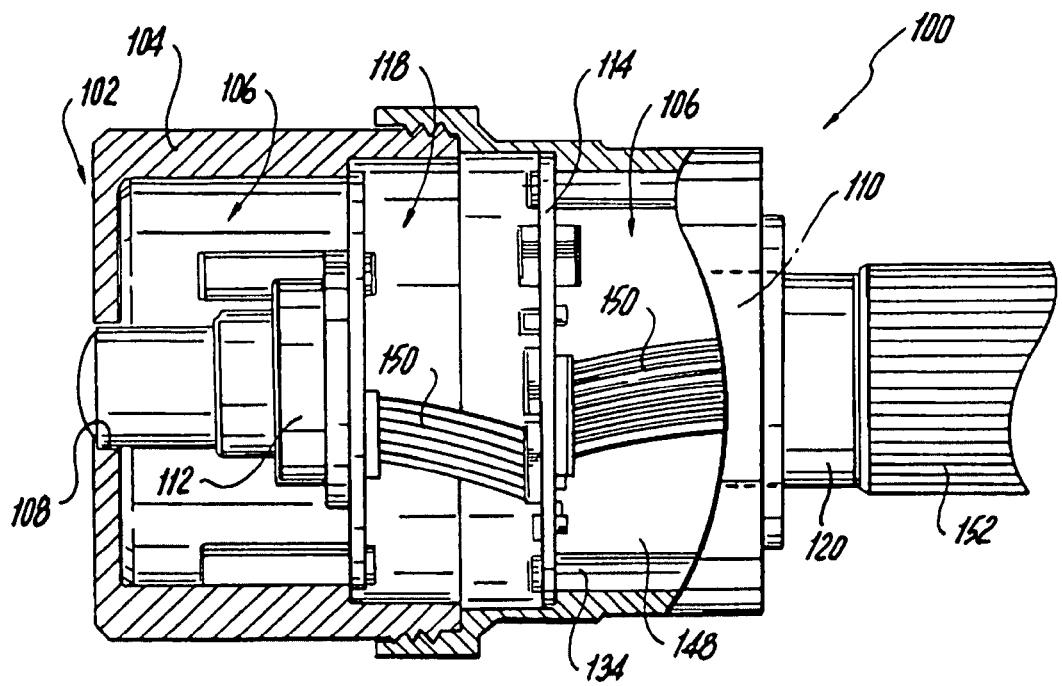
FIG. 3 is a cross-sectional side-elevation view of the camera of FIG. 1, showing the imaging device and PWB mounted within the camera housing.

As shown in FIG. 1, camera 100 has an electrically conductive housing 102 defined by exterior walls 104 made of aluminum, or any other suitable material. FIG. 2 shows camera 100 in an exploded view to reveal interior cavity 106 within exterior walls 104. A lens opening 108 is provided through walls 104 to allow for imaging. A connector opening 110 is also formed through walls 104. As can be seen in FIG. 3, an imaging device 112 is disposed within interior cavity 106 of housing 102. Imaging device 112 communicates optically with lens opening 108, and can include digital imaging components such as a charged coupled device (CCD), as well as other components such as clock frequency generators and switching power supplies. A printed wiring board (PWB) 114 disposed within interior cavity 106 separates imaging device 112 from connector opening 110.

With continued reference to FIG. 3, camera 100 further includes a camera connector 120 operatively associated with connector opening 110 of housing 102. Connector 120 is electrically coupled to imaging device 112 to convey desirable signals between imaging device 112 and an area external to housing 102, such as by connecting to a cable 152. Connector 120 can be any suitable type of connector. In known cameras, an opening through the housing for a cable connector is a path for a substantial amount of unwanted RF emissions into and out of the housing. However, camera 100 includes PWB 114 configured to reduce or eliminate such unwanted RF emissions along a path from imaging device 112 and connector opening 110. PWB 114 is located between the imaging device and the connector to separate the portion of interior cavity 106 containing imaging device 112 from doghouse portion 148 of cavity 106 within housing 102 and thereby reduce unwanted Radio Frequency (RF) emissions between imaging device 112 and connector opening 110 of housing 102. PWB 114 is fastened to an inwardly extending mounting ledge 134 defined in interior cavity 106 of housing 102. PWB 114 has an electrically conductive chassis plane 116 operatively connected to exterior walls 104 of housing 102 so that chassis plane 116 and housing 102 form a Faraday cage 118 around imaging device 112. Housing 102 can be connected to an electrical ground, thereby grounding chassis plane 116.

Figure 4:
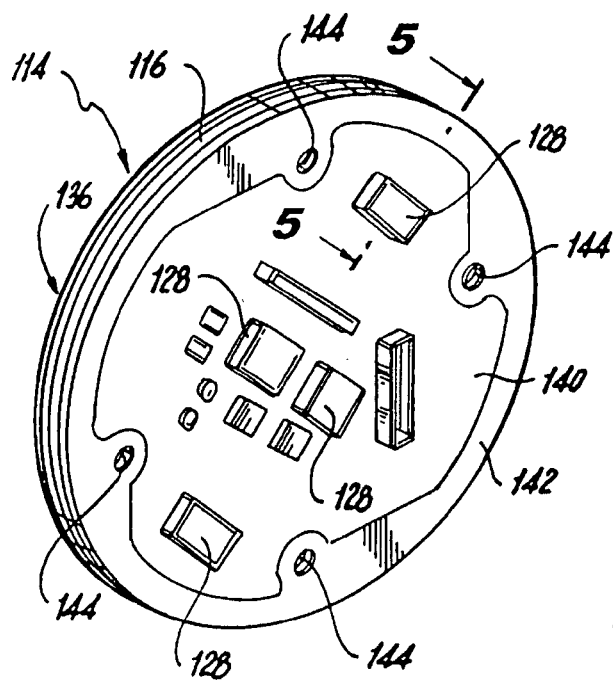
FIG. 4 is perspective view of a portion of the camera of FIG. 2, showing a plurality of EMI filters on a surface of the PWB.
Figure 5:
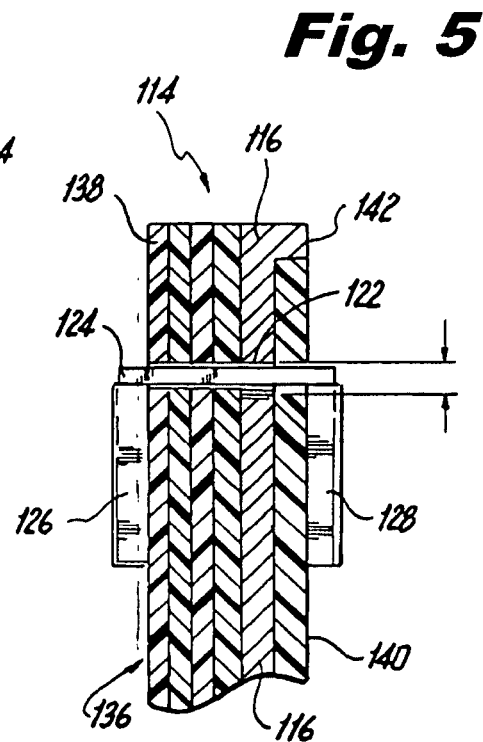
FIG. 5 is a cross-sectional side-elevation view of the PWB of FIG. 4, showing a pair of EMI filters connected by a transmission line passing through an aperture in the chassis plane layer of the PWB.

PWB 114 connects imaging device 112 of a camera 100 to external devices to allow desired signals to pass while shielding against unwanted EMI emissions into and out of imaging device 112. As shown in FIGS. 4-5, PWB 114 includes a layer stackup 136 having a plurality of layers including a first signal layer 138 on an imaging device side of layer stackup 136, and a second signal layer 140 on a side of layer stackup 140 opposite from first signal layer 138. A substantially solid chassis plane 116 is included in layer stackup 136 between first and second signal layers 138, 140. Chassis plane 116 can be made of any suitable metal, such as copper alloys, or any other electrically conductive material. Chassis plane 116 includes at least one mounting surface 142 configured to electrically couple chassis plane 116 to housing 102, and thereby to an electrical ground. Chassis plane 116 is thus electrically coupled to housing 102 to form a portion of Faraday cage 118 directly in the path between imaging device 112 and connector opening 110, as shown in FIG. 3. This reduces or eliminates the path into and out of connector opening 110 for unwanted EMI emissions to and from imaging device 112.

With continued reference to FIG. 5, in order to allow the desired signals to pass between imaging device 112 and connector 120, chassis plane 116 includes a plurality of passages 122, each accommodating a transmission line 124 passing therethrough. One transmission line 124 is provided for each desired signal needed between imaging device 112 and external devices. Those skilled in the art will readily appreciate that any number of transmission lines or signals can be provided without departing from the spirit and scope of the invention. Passages 122 through Faraday cage 118 can be dimensioned to reduce transmission of unwanted RF emissions therethrough above a predetermined wavelength. By configuring the linear dimensions to minimize gaps in a Faraday cage, the unwanted radio frequency emissions are attenuated. Reducing the gaps to 1/20 of a wavelength greatly decreases the emissions at and below the corresponding frequency. For example, limiting the gaps to 1.5 cm attenuates the emissions below about 1 GHz.

Transmission lines 124 are configured to conduct desired signals through layer stackup 136. Each transmission line 124 includes a first EMI filter 126 operatively connected thereto on the imaging device side of layer stackup 136 and a second EMI filter 128 operatively connected thereto opposite from the imaging device side of layer stackup 136 to filter unwanted RF emissions from passing through transmission line 124 to and from the imaging device side of layer stackup 136. Those skilled in the art will appreciate that one or both EMI filters can be eliminated without departing from the spirit and scope of the invention. However, the EMI filters reduce or prevent unwanted EMI emissions through transmission lines 124, thus contributing to the overall improved EMI performance of camera 100.

As shown in FIG. 4, layer stackup 136 includes mounting bores 144 configured to receive a fastener, such as a screw, bolt, or any other suitable fastener, to fasten PWB 114 into housing 102. Bores 144 electrically couple mounting surfaces 142 of chassis plane 116 to an electrical ground, via housing 102. When assembled, cables or connectors 150 connect imaging device 112 and connector 120 to their respective EMI filters 126,128.

Figure 6:
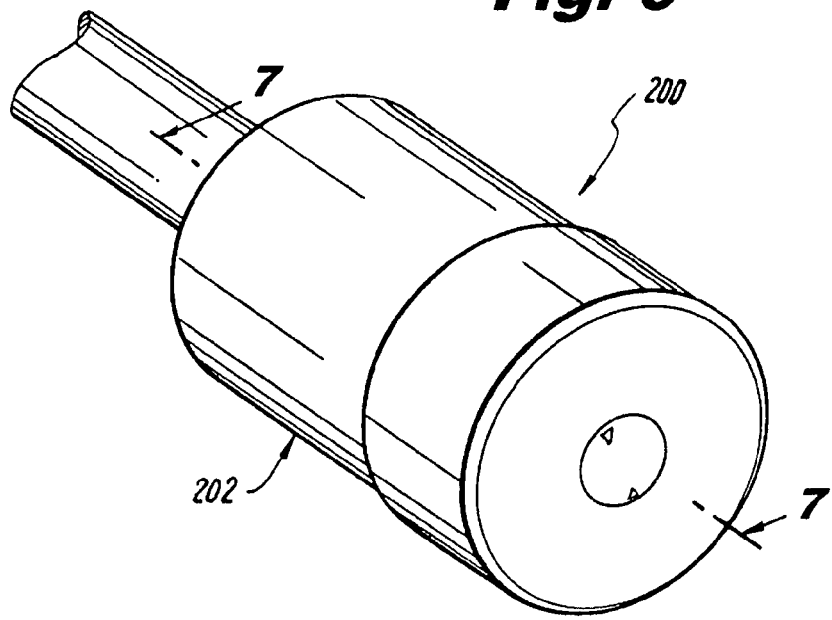
FIG. 6 is a perspective view of another exemplary embodiment of a camera constructed in accordance with the present invention, showing the camera housing.
Figure 7:
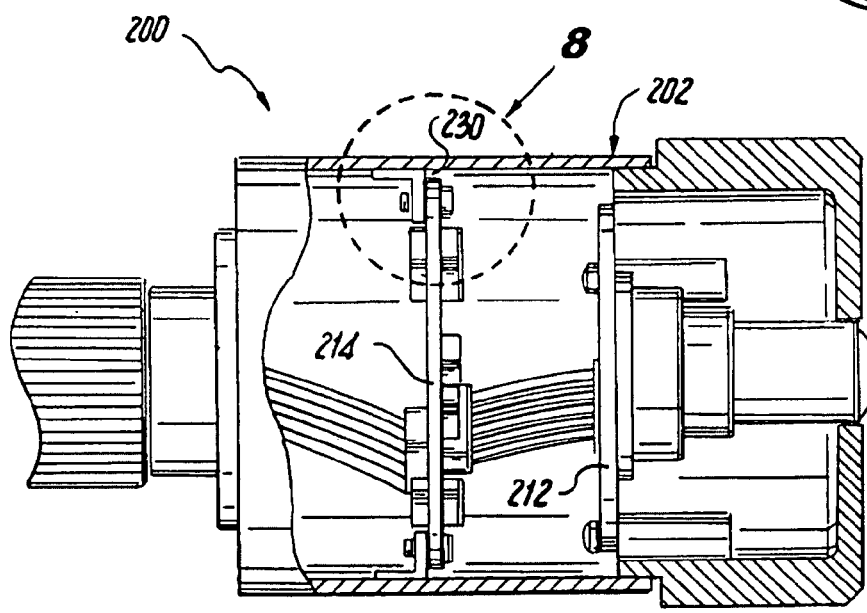
FIG. 7 is a cross-sectional side-elevation view of the camera of FIG. 6, showing a circumferential gap between the periphery of the PWB and the camera housing.
Figure 8:
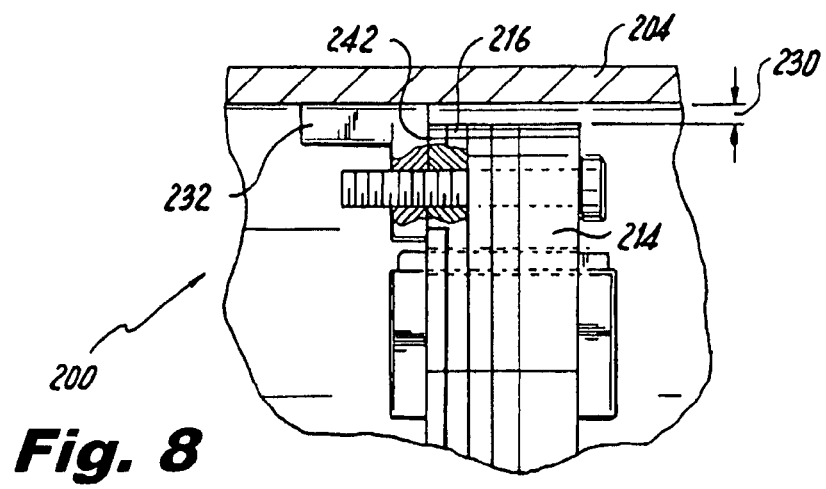
FIG. 8 is a cross-sectional side-elevation view of a portion of the camera of FIG. 7, showing a pair of EMI filters and the gap between the periphery of the PWB and the camera housing.

FIGS. 6-8 shows another embodiment. Camera 200 includes a housing 202, PWB 214, and imaging device 212 much as those described above with respect to camera 100. However, PWB 214 connects to housing 202 in a different matter. As shown in FIG. 7, rather than having a PWB fastened to an inward ledge in the housing, a gap 230 is defined between external walls 204 of housing 202 and the periphery of PWB 214. At least one electrically conductive standoff 232 connects chassis plane 216 of PWB 214 to camera housing 202 across gap 230. Mounting surfaces 242, shown in FIG. 8, of chassis plane 216 can be configured for attachment to an electrically conductive standoff 232 for operatively coupling chassis plane 216 to an electrical ground via housing 202. It is also possible to route transmission lines around a PWB (e.g., around the outer edge of PWB 214, through gap 230) rather than routing them through the PWB itself. Those skilled in the art will appreciate that any suitable routing of transmission lines from one side to the other of a PWB can be used without departing from the spirit and scope of the invention. Optionally, conductive seals can be added between PWB 214 and housing 202 in the Faraday cage in order to enhance the EMI filtering capabilities.

Figure 9:
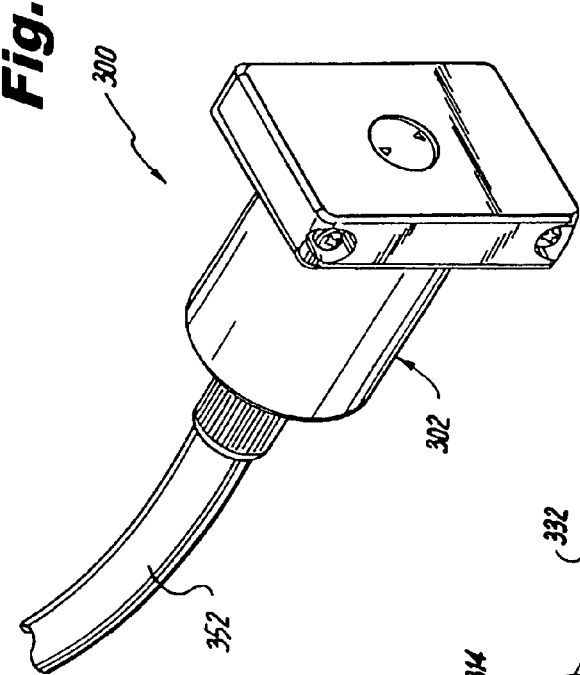
FIG. 9 is a perspective view of another exemplary embodiment of a camera constructed in accordance with the present invention, showing the camera housing and attached cable.
Figure 10:
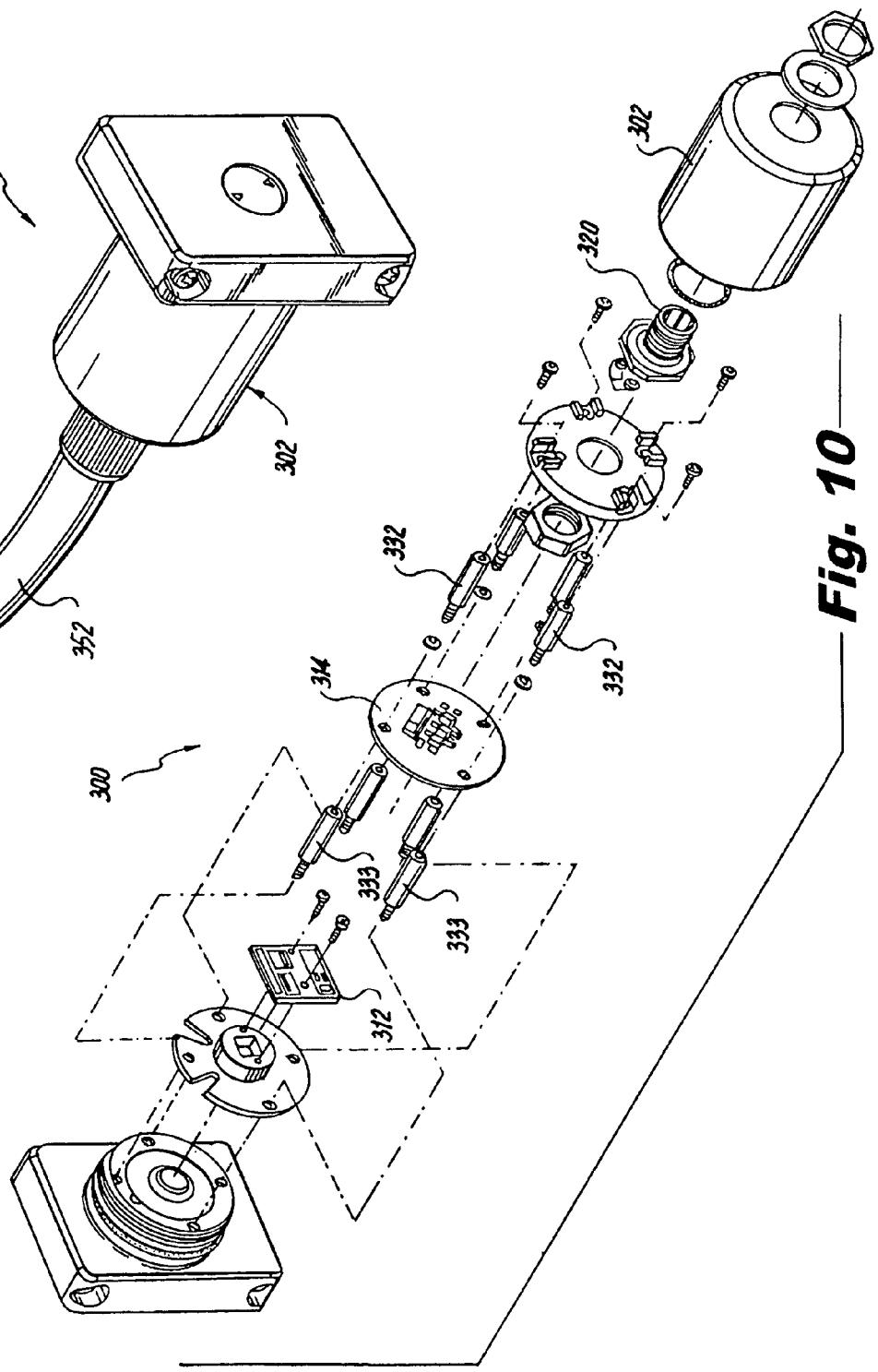
FIG. 10 is an exploded perspective view of the camera of FIG. 9, showing how the PWB connects to the housing by way of standoffs.

FIGS. 9-10 show camera 300, which is another embodiment. Camera 300 has a housing 302, PWB 314, imaging device 312, and connector 320 that are configured much as those described above. FIG. 9 shows cable 352 connected to camera 300. As indicated in FIG. 10, the electrical connection between the chassis plane of PWB 314 is achieved through electrically conductive standoffs 332/333, which are fastened within housing 302 so as to complete the electrical connection to form the Faraday cage shielding imaging device 312. Both groups of standoffs (332 and 333) electrically couple PWB 314 to housing 302, however it is possible for fewer standoffs to complete the electrical coupling.

The devices and methods described above provide the advantages of improving the EMI performance of cameras and can be used with other similar devices to gain the same benefits without departing from the spirit and scope of the invention. Radiated Emissions are substantially reduced by blocking pathways through the connector opening in the camera housing with a conductive chassis plane in the PWB that forms part of a Faraday cage with the camera housing. Additionally, the methods and devices described above also improve the robustness of cameras with respect to other EMI requirements including Radiated Susceptibility, Conducted Susceptibility, and Conducted Emissions.

The methods and systems of the present invention, as described above and shown in the drawings, provide for cameras with superior properties including improved EMI performance. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A camera comprising:
   a) an electrically conductive housing defined by exterior walls and an interior cavity, the exterior walls of the housing having a lens opening and a connector opening formed therein;
   b) an imaging device disposed within the interior cavity of the housing and optically communicating with the lens opening; and
   c) a printed wiring board disposed within the interior cavity of the housing separating the imaging device from the connector opening, the printed wiring board having an electrically conductive chassis plane operatively connected to the exterior walls of the housing such that the chassis plane and the housing form at least a partial Faraday cage around the imaging device.

2. A camera as recited in claim 1, further comprising a camera connector operatively associated with the connector opening of the housing, wherein the connector is electrically coupled to the imaging device to convey signals between the imaging device and an area remote from the housing, and wherein the printed wiring board is located between the imaging device and the connector to reduce unwanted radio frequency emissions between the imaging device and the connector opening of the housing.

3. A camera as recited in claim 1, wherein at least one passage is formed in the Faraday cage to allow a transmission line to pass therethrough, wherein the transmission line is electrically connected to the imaging device to conduct a signal between the imaging device and an area remote from the housing.

4. A camera as recited in claim 3, wherein the transmission line includes an EMI filter between the imaging device and the printed wiring board to filter unwanted radio frequency emissions from the imaging device to the connector opening along the transmission line.

5. A camera as recited in claim 3, wherein the transmission line includes an EMI filter between the printed wiring board and the connector opening of the housing to filter unwanted radio frequency emissions from the connector opening to the imaging device along the transmission line.

6. A camera as recited in claim 3, wherein the passage accommodating the transmission line therethrough is defined through the chassis plane of the printed wiring board.

7. A camera as recited in claim 6, and wherein the transmission line includes a first EMI filter between the printed wiring board and the imaging device and a second EMI filter opposite the first EMI filter across the chassis plane to filter unwanted radio frequency emissions through the at least one transmission line between the imaging device and the connector opening of the housing.

8. A camera comprising:
a) an electrically conductive housing defined by exterior walls and an interior cavity, the exterior walls of the housing having a lens opening and a connector opening formed therein;
b) an imaging device disposed within the interior cavity of the housing and communicating with the lens opening;
c) a camera connector operatively associated with the connector opening of the housing;
d) at least one transmission line electrically connecting the imaging device to the camera connector to convey signals between the imaging device and an area remote from the housing; and
e) a printed wiring board disposed within the interior cavity of the housing separating the imaging device from the connector opening, the printed wiring board having an electrically conductive chassis plane operatively connected to the exterior walls of the housing such that the chassis plane and the housing form at least a partial Faraday cage around the imaging device to filter radio frequency emissions between the imaging device and the connector opening of the housing, wherein at least one passage is formed in the at least partial Faraday cage to allow the at least one transmission line to pass therethrough, and wherein the at least one transmission line includes a first EMI filter between the printed wiring board and the imaging device and a second EMI filter between the printed wiring board and the connector to filter unwanted radio frequency emissions between the imaging device and the connector opening through the at least one transmission line.

9. A camera as recited in claim 8, wherein the Faraday cage is configured and dimensioned to reduce transmission of unwanted radio frequency emissions therethrough below about 1 GHz.

10. A camera as recited in claim 8, wherein a gap is defined between the external walls of the housing and a periphery of the printed wiring board, and wherein the gap is dimensioned and configured to reduce transmission of unwanted radio frequency emissions therethrough below a predetermined frequency.

11. A camera as recited in claim 10, wherein the printed wiring board is fastened to the housing by electrically conductive standoffs, operatively connecting the chassis plane to the housing.

12. A camera as recited in claim 8, wherein the printed wiring board is fastened to an inwardly extending mounting ledge defined in the interior cavity of the housing, operatively connecting the chassis plane to the housing.

13. A Faraday cage for shielding an electronic device comprising:
a) an electrically conductive housing defined by exterior walls and an interior cavity; and
b) a printed wiring board electrically connected to the exterior walls of the housing, the printed wiring board including:
i) a layer stackup having a plurality of layers including a first signal layer on an imaging device side of the layer stackup, and a second signal layer on a side of the layer stackup opposite from the first signal layer; and
ii) a substantially solid electrically conductive chassis plane in the layer stackup between the first and second signal layers, wherein the chassis plane includes at least one mounting surface electrically coupling the chassis plane to an the exterior walls of the housing.

14. A Faraday cage as recited in claim 13, wherein the chassis plane includes a passage accommodating a transmission line passing therethrough, wherein the transmission line is configured to conduct a signal through the layer stackup.

15. A Faraday cage as recited in claim 14, wherein the transmission line includes an EMI filter operatively connected thereto on the imaging device side of the layer stackup to filter unwanted radio frequency emissions from the imaging device side from passing through the transmission line.

16. A Faraday cage as recited in claim 14, wherein the transmission line includes an EMI filter operatively connected thereto on a side of the layer stackup opposite from the imaging device side to filter unwanted radio frequency emissions from passing through the transmission line to the imaging device side of the layer stackup.

17. A Faraday cage as recited in claim 13, wherein the chassis plane includes a plurality of passages, each accommodating a transmission line passing therethrough, wherein the transmission lines are configured to conduct signals through the layer stackup, and wherein each transmission line includes a first EMI filter operatively connected thereto on the imaging device side of the layer stackup and a second EMI filter operatively connected thereto opposite from the imaging device side of the layer stackup to filter unwanted radio frequency emissions from passing through the transmission line to and from the imaging device side of the layer stackup.

18. A Faraday cage as recited in claim 13, wherein the layer stackup includes at least one mounting bore configured to receive a fastener therethrough so as to electrically couple the at least one mounting surface of the chassis plane to the exterior walls of the housing.

19. A Faraday cage as recited in claim 13, wherein the at least one mounting surface of the chassis plane is configured for attachment to an electrically conductive standoff for operatively coupling the chassis plane to the exterior walls of the housing.

* * * * *